United States Patent
Bhandari

(10) Patent No.: US 8,233,397 B1
(45) Date of Patent: Jul. 31, 2012

(54) DEVICE FOR AND METHOD OF MAKING ELEMENT APPEAR IN SHORTEST NETWORK PATH BY MINIMAL DECREMENTS AND INCREMENTS

(75) Inventor: Ramesh Bhandari, Silver Spring, MD (US)

(73) Assignee: The United States of America as represented by the Director, National Security Agency, Washington, DC (US)

( * ) Notice: Subject to any disclaimer, the term of this patent is extended or adjusted under 35 U.S.C. 154(b) by 0 days.

(21) Appl. No.: 12/803,045

(22) Filed: Feb. 28, 2011

(51) Int. Cl.
*G01R 31/08* (2006.01)
(52) U.S. Cl. ........................ 370/237; 370/238
(58) Field of Classification Search .......... 370/237, 370/238, 255, 392, 400
See application file for complete search history.

(56) References Cited

U.S. PATENT DOCUMENTS

| | | | |
|---|---|---|---|
| 6,321,271 B1 | 11/2001 | Kodialam et al. | |
| 6,765,880 B1 | 7/2004 | Hillard et al. | |
| 6,831,895 B1* | 12/2004 | Ji et al. | 370/237 |
| 6,928,484 B1* | 8/2005 | Huai et al. | 709/239 |
| 6,992,988 B2 | 1/2006 | Reynders et al. | |
| 7,280,481 B2 | 10/2007 | Rong | |
| 7,457,286 B2 | 11/2008 | Alexander, Jr. | |
| 7,593,341 B1 | 9/2009 | Buriol et al. | |
| 2004/0032831 A1 | 2/2004 | Matthews | |
| 2004/0205239 A1* | 10/2004 | Doshi et al. | 709/241 |
| 2005/0088965 A1* | 4/2005 | Atlas et al. | 370/216 |

OTHER PUBLICATIONS

B. Fortz et al., "Traffic Engineering with Traditional IP Routing Protocols", IEEE Communications Magazine 40(10), pp. 118-124, 2002.
W. Ben Ameur et al., "Internet Routing and Related Topology Issues", SIAM Jounrnal of Discrete Mathematics, 17(1), pp. 18-49, 2003.
P. Nilsson, "On the Inverse Shortest Paths Problem", 17th Nordic Teletraffic Seminar (NTS 17), Fornebu, Norway, Aug. 2004.
R. Bhandari, Abstract "The Sliding Shortest Path Problem", published Mar. 22, 2007 in conjunction with the 20th Cumberland Conference, May 17-19, 2007, Emory Univ., Atlanta GA.

* cited by examiner

Primary Examiner — Jung Park
(74) Attorney, Agent, or Firm — Robert D. Morelli

(57) ABSTRACT

A device and method of minimally incrementing and decrementing the weights of a minimal number of links in a network to cause a link/node that is not in the shortest path in the network to be in the shortest path by determining the shortest path with link/node, identifying links in this path that are not in the shortest path without link/node, decrementing identified links to make the path the shortest path, identifying a link in the shortest path without link/node not in the path with link/node, incrementing the link, redoing these steps to determine a number of links and modifications to links that would cause the link/node to appear in the shortest path, identifying the set of links and modifications with the fewest links, and modifying the network in accordance with the identified set.

19 Claims, 7 Drawing Sheets

US 8,233,397 B1

DEVICE FOR AND METHOD OF MAKING ELEMENT APPEAR IN SHORTEST NETWORK PATH BY MINIMAL DECREMENTS AND INCREMENTS

FIELD OF INVENTION

The present invention relates, in general, to electrical computers and digital processing systems and, in particular, to least weight routing.

BACKGROUND OF THE INVENTION

In telecommunication networks, it is often desirable to change the link weights to engender path changes in a certain desired fashion. For example, a bank data transfer in the commercial world between a given pair of offices might need to be occasionally processed at a third intermediate office before arriving at the destination node, in which case one might alter weights of a certain subset of links to cause the route to traverse the intermediate node. In another instance, a high capacity link might suddenly become available over which the traffic between the given source-destination pair of an important customer might need to be rerouted to alleviate congestion on the current route, and maintain the desired quality of service as warranted, perhaps, by a service-level agreement.

The problem of changing routes within a network by altering the weights has been discussed in the following articles: "Traffic engineering with traditional IP routing protocols," by B. Fortz et al., *IEEE Communications Magazine*, 40(10), pp 118-124, 2002; "Internet Routing and Related Topology Issues," by W. Ben-Ameur et al., *SIAM Journal of Discrete Mathematics*, 17(1), pp 18-49, 2003; and "On the Inverse Shortest Path Problem," by Pal Nilsson, $17^{th}$ *Nordic Teletraffic Seminar* (NTS 17), Fornebu, Norway, August 2004. Very often, the techniques involve integer programming formulations because of the requirement of integrality of link weights, leading frequently to approximations such as linear relaxation.

In an abstract entitled "The Sliding Shortest Path Problem," published on Mar. 22, 2007 in conjunction with the $20^{Th}$ Cumberland Conference, May 17-19, 2007, Emory University, Atlanta, Ga., the inventor disclosed the following. Given an undirected weighted graph and a pair of vertices s and t, connected by the shortest path, and a third vertex p not lying on the shortest path, what is the minimal change in the graph weights needed to cause the shortest path between s and t to pass through vertex p? This is the type of problem often faced by network administrators in the telecommunication world. The inventor provided an algorithm for solving this problem; the approach taken is one of replacement of the weights of a set of edges of minimal cardinality with weights of "infinity." The algorithm determines the minimum cardinality set in polynomial time. Furthermore, it is shown that it is easily extensible to pass over a given edge, instead of the given vertex, a scenario that can also occur in telecommunication networks. The algorithm disclosed minimizes the number of edges to be modified, but does not minimize the change to the weights of such edges, because changing such weights to "infinity" effectively cuts those edges out of the network. A solution to the problem is needed that does not cut such edges out of the network, because such edges are useful for carry communication traffic not related to the communication traffic to be transmitted via the newly formed shortest path.

Therefore an improvement to the method presented in March 2007 is needed. The present invention is such an improvement.

There is a need for a device for and method of identifying the minimal changes that need to be made to a network for a specific demand (a single source-destination pair) to be rerouted through a desired link or vertex not already on the shortest path of the given demand, where the number of links on which weight changes are made is minimized in order to reduce the implementation time of link weight changes within the current network environment, and where the weight changes (decrements and increments) are minimized in order to cause the least amount of impact on the number of other shortest paths (routes of other demands). The present invention is such a device and method.

U.S. Pat. No. 6,321,271, entitled "CONSTRAINED SHORTEST PATH ROUTING METHOD," discloses a two-phase method of determining the shortest weight and finding the cumulative delay from the destination to the source. U.S. Pat. No. 6,321,271 is hereby incorporated by reference into the specification of the present invention.

U.S. Pat. No. 6,765,880, entitled "METHOD AND APPARATUS FOR ELIMINATING UNPROTECTED PATHS FROM CONSIDERATION DURING COMPUTATION OF PROTECTABLE SHORTEST PATH TREE," discloses a device for and method of finding a shortest path using the concept of a protectable link, where a protectable link is one that is a member of a loop. U.S. Pat. No. 6,765,880 is hereby incorporated by reference into the specification of the present invention.

U.S. Pat. No. 6,928,484, entitled "METHOD AND APPARATUS FOR DISCOVERING EDGE-DISJOINT SHORTEST PATH PAIRS DURING SHORTEST PATH TREE COMPUTATION," discloses a device for and method of finding the shortest path that has an alternate path, where such a path is not necessarily the absolute shortest path. U.S. Pat. No. 6,928,484 is hereby incorporated by reference into the specification of the present invention.

U.S. Pat. No. 6,992,988, entitled "SYSTEM AND METHOD FOR DEADLOCK-FREE ROUTING ON ARBITRARY NETWORK TOPOLOGIES," discloses a device for and method of calculating a deadlock-free set of paths by generating an ordered set of deadlock-free sub-topologies. U.S. Pat. No. 6,992,988 is hereby incorporated by reference into the specification of the present invention.

U.S. Pat. No. 7,280,481, entitled "METHOD AND APPARATUS FOR ELIMINATING UNPROTECTED PATHS FROM CONSIDERATION DURING COMPUTATION OF PROTECTABLE SHORTEST PATH TREE," discloses a device for and method of selecting a meet node, calculating a shortest path from a source node to the meet node, calculating a shortest path from a destination node to the meet node, and concatenating the two paths to form a path from the source node to the destination node. U.S. Pat. No. 7,280,481 is hereby incorporated by reference into the specification of the present invention.

U.S. Pat. No. 7,457,286, entitled "ACCELERATING THE SHORTEST PATH PROBLEM," discloses a method of accelerating the determination of the shortest path by grouping nodes. U.S. Pat. No. 7,457,286 is hereby incorporated by reference into the specification of the present invention.

U.S. Pat. No. 7,593,341, entitled "METHOD AND APPARATUS FOR UPDATING A SHORTEST PATH GRAPH," discloses a device for and method of placing a subset of nodes affected by a change in weight of an arc into a heap and then determining the shortest path from the nodes placed in the heap. U.S. Pat. No. 7,593,341 is hereby incorporated by reference into the specification of the present invention.

U.S. Pat. Appl. No. 20040032831, entitled "SIMPLEST SHORTEST PATH FIRST FOR PROVISIONING OPTICAL CIRCUITS IN DENSE MESH NETWORK CONFIGURATIONS," discloses a method of determining the shortest path using a multi-layered network path determination method and a cache strategy to cache approximate paths, rather than exact paths, and to age out cache entries just before they become incorrect, and a method of turning an approximate path into an exact path. U.S. Pat. Appl. No. 20040032831 is hereby incorporated by reference into the specification of the present invention.

SUMMARY OF THE INVENTION

It is an object of the present invention to identify the minimum set of links in a network and the minimal decrements and increments to the weights of such links so that a user-definable element (i.e., a node or a link in the network that does not appear in the shortest path of the unmodified network) appears in the shortest path of the network if modified by the identified links and weight modifications.

The present invention is a device for and a method of determining the minimal set of links and the minimal weight decrements and increments to such links in order to cause an element, where the element is either a node (e.g., node p) or a link in the graph that was not on the shortest path from node s to node t in the unmodified network to appear in the shortest path from s to t in the weight-modified network.

The device includes a receiver, a first shortest-path finder, an element selector, a variable/set setter, a path finder, a link finder, a decrement checker, a link decrementer, a link finder/incrementer, a duplicate shortest-path finder, a second-set adder, an index incrementer, a modified-weight resetter, a second shortest-path finder, a non-common link finder and set updater, a link incrementer, a third shortest-path finder, an element-in-shortest-path checker, a second duplicate-path checker, a minimum-links finder, and a network modifier.

The method includes receiving a graph, determining a shortest path from s to t, selecting an element not in the shortest path, setting n=1 and a first set to null, determining a path from s to t that includes the element, and identifying links in a path from s to t that includes the element that are not in the shortest path from s to t that does not include the element, and decrementing minimally the weights of a minimal number of links. If the weight-modified path from s to t including the element is not a shortest path then identifying a link (e.g., a first link in the preferred embodiment) in the shortest path from s to t that does not include the element that is not in the path from s to t that includes the element, incrementing minimally the weight of the identified link, and if the path from to t that includes the element is still not a shortest path in the graph then redoing these steps. If there is a path from s to t that does not include the element that has an equal sum of weights as the path from s to t that includes the element then identifying such a path as the shortest path from s to t that does not include the element and returning to previous step. Including in an indexed second set the links that were just modified, the links in the first set, and the modifications made to said links, and setting n=n+1. Resetting the weights just modified to the corresponding weights as initially received, identifying a shortest path from s to t that does not include the element, identifying a link (e.g., a first link in a preferred embodiment) in the shortest path from s to t that does not include the element that is not in the path from s to t that includes the element and adding it to the first set, incrementing minimally the weight of the identified link, and determining the shortest path from s to t. If the shortest path from s to t determined does not include the element then returning to the step of identifying links in a path from s to t that include the element that are not in the path from s to t that does not include the element. If a path from s to t that does not include the element is equal to the path from s to t that includes the element then designating that path the shortest path from s to t that does not include the element and returning to the step of identifying a link (e.g., a first link in a preferred embodiment) in the shortest path from s to t that does not include the element that is not in the path from to t that includes the element and adding it to the first set. Otherwise, setting the second set equal to the first set. Identifying which set of links in the second sets includes the fewest number of links, and modifying the network accordingly with the corresponding increments and decrements.

DETAILED DESCRIPTION

The present invention is a device for and a method of determining the minimal set of links and the minimal weight decrements and increments to such links in order to cause an element (i.e., a node or a link between two nodes) in a graph of a network that was not in the shortest path of the original network to appear in the shortest path of the network after the weight of one or more links is modified.

Figure 1:
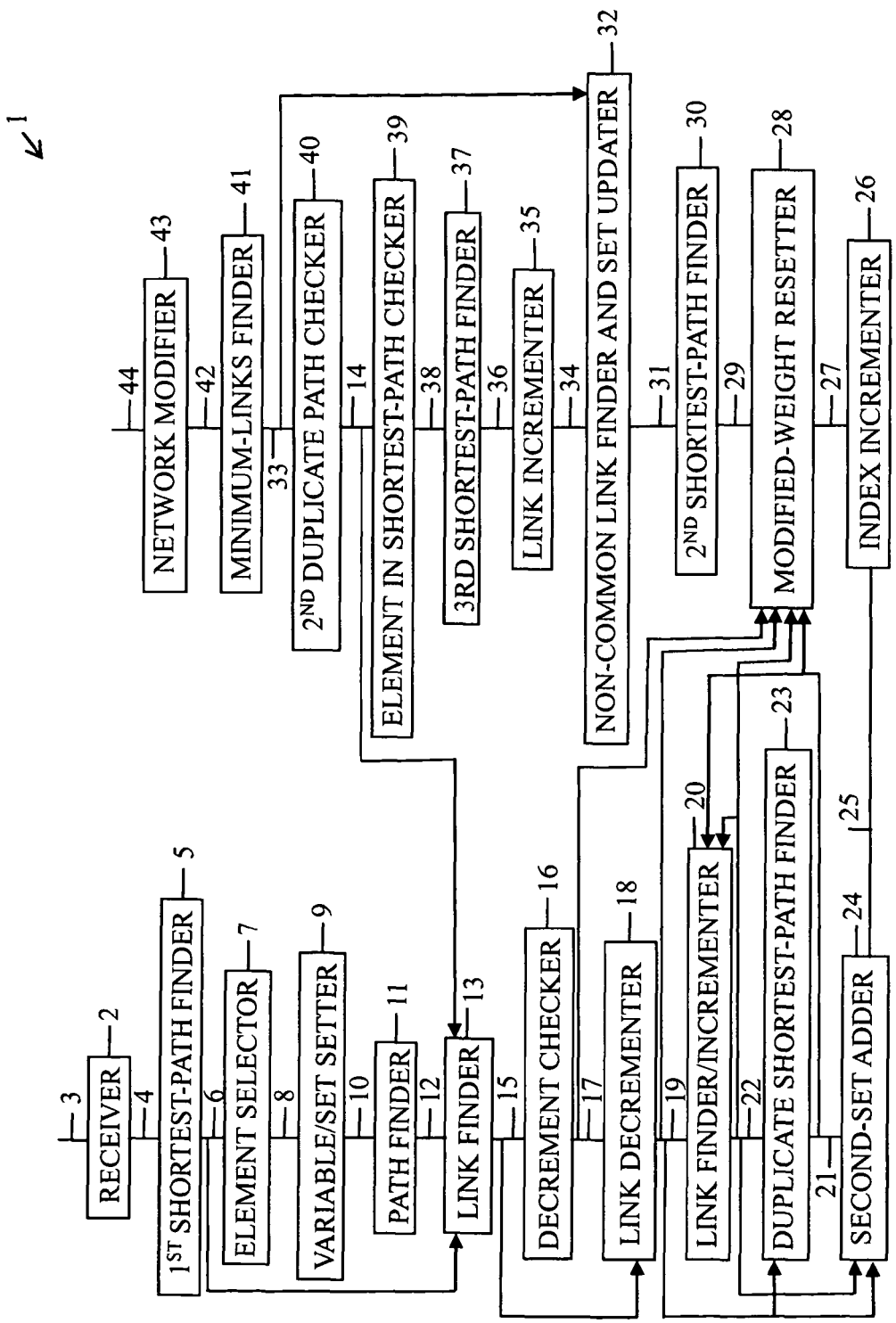
FIG. 1 is a schematic of the preferred device of the present invention.
Figure 2A:
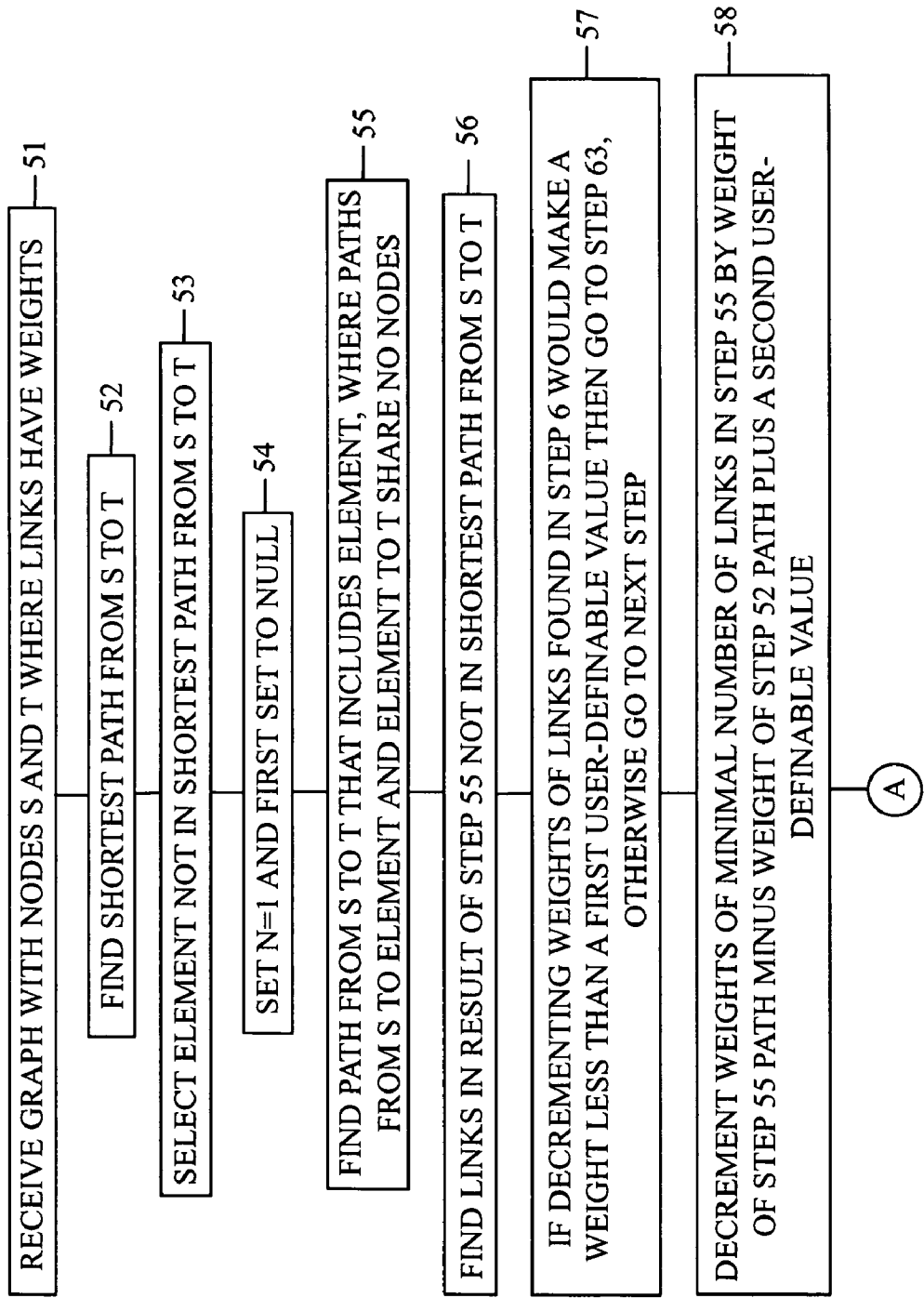
FIGS. 2A-2D are flow-charts of the preferred method of the present invention.
Figure 2B:
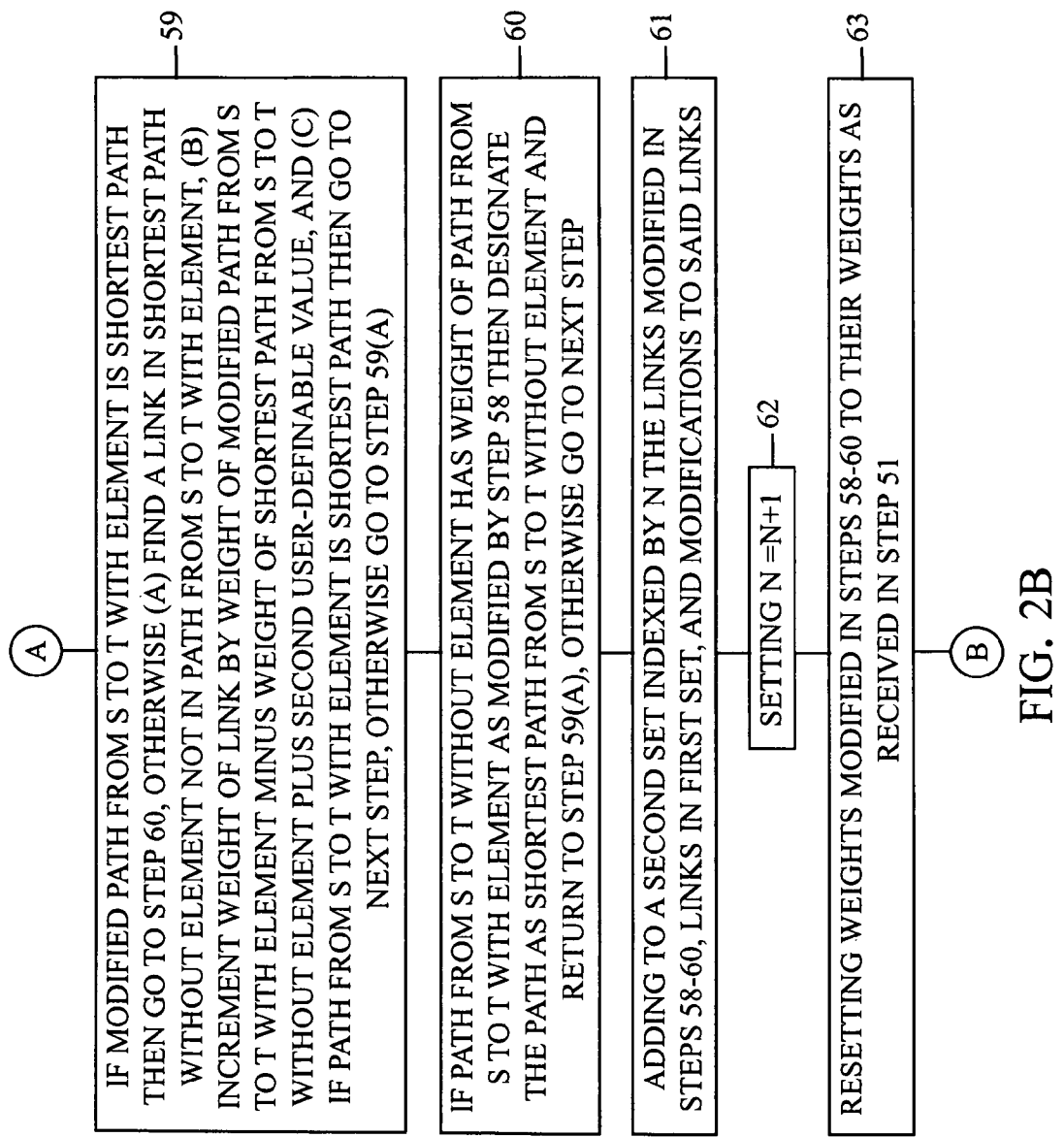
Figure 2C:
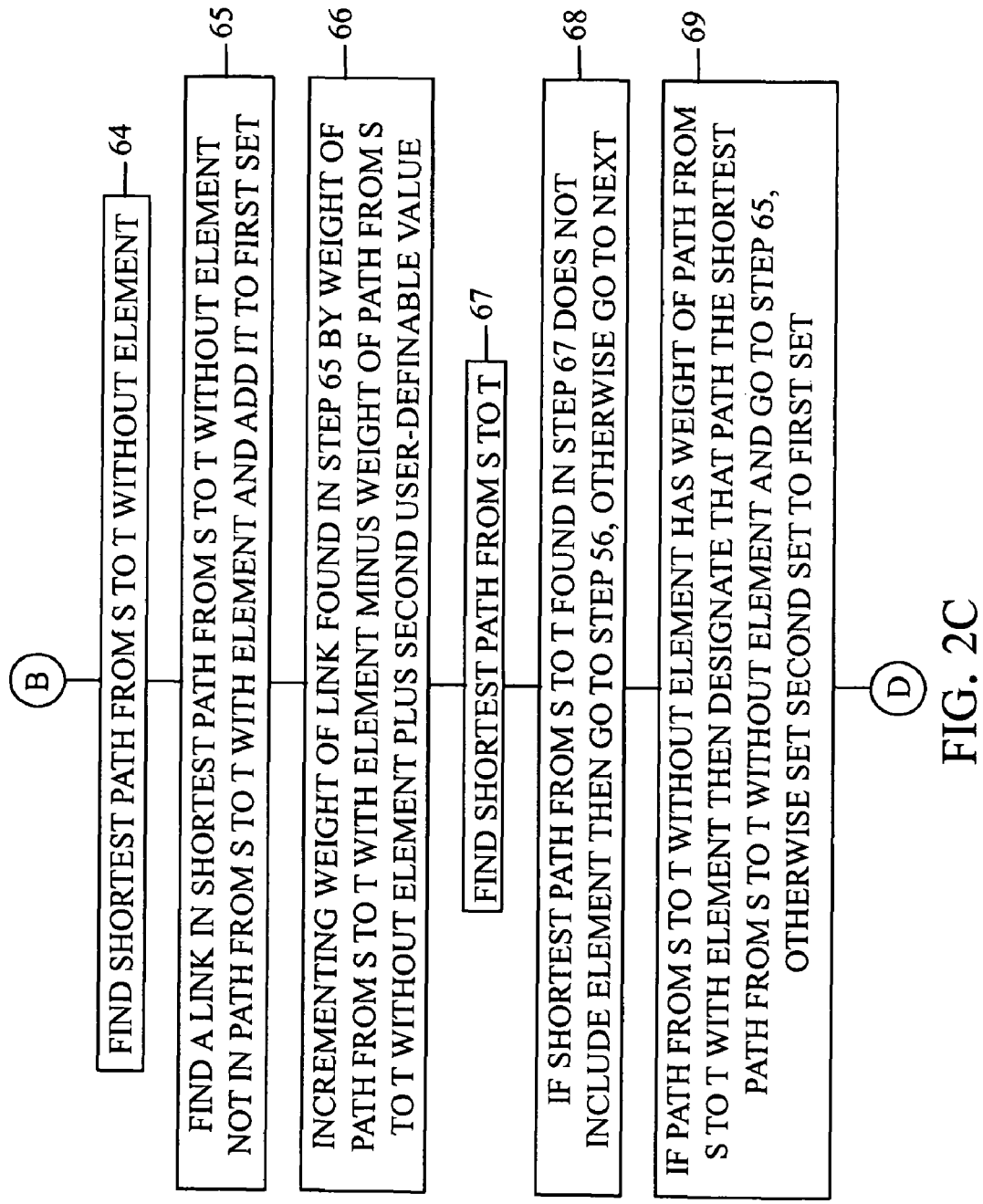
Figure 2D:
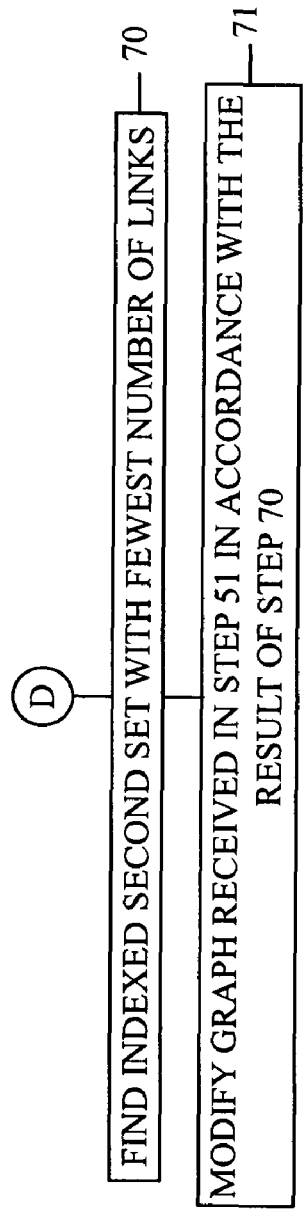

FIG. 1 is a schematic of the preferred device 1 of the present invention.

The device 1 includes a receiver 2 for receiving a weighted graph, where the graph is selected from the group of graphs consisting of undirected graph and directed graph, where the graph includes nodes, links, a source node s, and a destination node t, where the weight of each link is a real number. In the preferred embodiment, the weight of each link is a positive integer, one and greater. The receiver 2 has an input 3 and an output 4.

The device 1 includes a first shortest-path finder 5 for determining a shortest path from s to t. A shortest path is one for which a sum of the weights of the associated links is minimized. The first shortest-path finder 5 has an input connected to the output 4 of the receiver 2, and has an output 6.

The device 1 includes an element selector 7 for selecting a user-definable element in the graph that is not in the shortest path determined by the first shortest-path finder 5. The element selector 7 has an input connected to the output 6 of the first shortest-path finder 5, and has an output 8.

The device 1 includes a variable/set setter 9 for setting n=1 and a first set equal to a null set. The variable/set setter 9 has an input connected to the output 8 of the element selector 7, and has an output 10.

The device 1 includes a path finder 11 for determining a path from s to t that includes the user-definable element, where said path includes a first path from s to the user-definable element and a second path from the user-definable element to t, where the first path and the second path do not have any node in common except a node associated with the user-definable element, when the user-definable element is a node. The path finder 11 has an input connected to the output 10 of the variable/set setter 9, and has an output 12.

The device 1 includes a link finder 13 for identifying links in a path from s to t that include the user-definable element that are not in the path from s to t that does not include the user-definable element. The link finder 13 has a first input connected to the output 6 of the first shortest-path finder 5, has a second input connected to the output 12 of the path finder 11, has a third input 14, and has an output 15.

The device 1 includes a decrement checker 16 for determining if decrementing the weights of links would result in a link having a weight less than a first user-definable value (e.g., the first user-definable value is one in the preferred embodiment so that valid weights are one or larger) and, if so, going to a modified-weight resetter 28 described below. The decrement checker 16 has an input connected to the output 15 of the link finder 13, and has an output 17.

The device 1 includes a link decrementer 18 for decrementing the weights of a minimal number of links identified by the link finder 13 by a total amount equal to the weights of the links from s to t including the user-definable element minus the weights of the links from s to t that do not include the user-definable element plus a second user-definable value. The link decrementer 18 has a first input connected to the output 15 of the link finder 13, has a second input connected to the output 17 of the decrement checker 16, and has an output 19.

The device 1 includes a link finder/incrementer 20 for determining if the weight-modified path from s to t including the user-definable element is now a shortest path in the graph. If so, going to a duplicate shortest-path finder 23 described below. Otherwise, identifying a link (e.g., a first link in the preferred embodiment) in the shortest path from s to t that does not include the user-definable element that is not in the weight-modified path from s to t that includes the user-definable element and incrementing the weight of the link identified by an amount equal to the sum of the weights of the weight-modified path from s to t that includes the user-definable element minus the sum of the weights of the links of the shortest path from s to t that does not include the user-definable element plus the second user-definable value. If the path from s to t that does not include the user-definable element is a shortest path in the graph then returning to the link finder/incrementer 20 to identify again a link (e.g., a first link in the preferred embodiment) in the shortest path from s to t that does not include the user-definable element that is not in the weight-modified path from s to t that includes the user-definable element. The link finder/incrementer 20 has a first input connected to the output 19 of the link decrementer 18, has a second input 21, has a third input 22, and has an output 50 connected to the third input 22 of the link finder/incrementer 20.

The device 1 includes the duplicate shortest-path finder 23 for determining if there is a path from s to t that does not include the user-definable element that has an equal sum of weights as the path from s to t that includes the user-definable element as modified then designating such a path as the shortest path from s to t that does not include the user-definable element and going to the link finder/incrementer 20 to identify another link in the shortest path from s to t that does not include the user-definable element that is not in the path from s to t that includes the user-definable element. The duplicate shortest-path finder 23 has a first input connected to the output 19 of the link decrementer 18, has a second input connected to the output 22 of the link finder/incrementer 20, and has an output connected to the second input 21 of the link finder/incrementer 20.

The device 1 includes a second-set adder 24 for including in a second set, which is indexed to n, the links that were modified, the links in the first set, and the modifications made to said links. The second-set adder 24 has a first input connected to the output 19 of the link decrementer 18, has a second input connected to the output 22 of the link finder/incrementer 20, has a third input connected to the output 21 of the duplicate shortest-path finder 23, and has an output 25.

The device 1 includes an index incrementer 26 for setting n=n+1. The index incrementer 26 has an input connected to the output 25 of the second-set adder 24, and has an output 27.

The device 1 includes a modified-weight resetter 28 for resetting the weights modified in the link decrementer 18, the link finder/incrementer 20, and duplicate shortest-path finder 23 to the corresponding weights in the graph received. The modified-weight resetter 28 has a first input connected to the output 17 of the decrement checker 16, a second input connected to the output 19 of the link decrementer 18, a third input connected to the output 22 of the link finder/incrementer 20, a fourth input connected to the output 21 of the duplicate shortest-path finder 23, a fifth input connected to the output 27 of the index incrementer 26, and an output 29.

The device 1 includes a second shortest-path finder 30 for identifying a shortest path from s to t that does not include the user-definable element. The second shortest-path finder 30 has an input connected to the output 29 of the modified-weight resetter 28, and an output 31.

The device 1 includes a non-common link finder and set updater 32 for identifying a first link in the shortest path from s to t that does not include the user-definable element that is not in the path from s to t that includes the user-definable element and adding it to the first set. The non-common link finder and set updater 32 has a first input connected to the output 31 of the second shortest-path finder 30, a second input 33, and an output 34.

The device 1 includes a link incrementer 35 for incrementing the weight of an identified link by an amount equal to the sum of the weights of the path from s to t that includes the user-definable element minus the sum of the weights of the path from s to t that does not include the user-definable element plus the second user-definable value. The link incrementer 35 has an input connected to the output 34 of the non-common link finder and set updater 32, and has an output 36.

The device 1 includes a third shortest-path finder 37 for determining the shortest path from s to t. The third shortest-path finder 37 has an input connected to the output 36 of the link incrementer 35, and has an output 38.

The device 1 includes an element-in-shortest-path checker 39 for determining if the shortest path from s to t includes the user-definable element and, if so, going to a second duplicate path checker 40 described below. Otherwise, returning to the link finder 13. The element-in-shortest-path checker 39 has an input connected to the output 38 of the third shortest-path finder 37, and has an output connected to the third input 14 on the link finder 13.

The device 1 includes a second duplicate-path checker 40 for determining if a path from s to t that does not include the user-definable element has a sum of weights equal to the sum of weights of the path from s to t that includes the user-definable element and, if so, designating that path the shortest path from s to t that does not include the user-definable element and going to the non-common link finder and set updater 32. Otherwise, setting the second set, which is indexed to n, equal to the first set. The second duplicate path checker 40 has an input connected to the output 14 of the element-in-shortest-path checker 39, and has an output connected to the second input 33 of the non-common link finder and set updater 32.

The device 1 includes a minimum-links finder 41 for identifying which of the indexed second sets includes the fewest number of links. The minimum-links finder 41 has an input connected to the output 33 of the second duplicate path checker 40, and has an output 42.

The device 1 includes a network modifier 43 for modifying the network received in accordance with the links and modifications to such links in the identified second set. The network modifier 43 has an input connected to the output 42 of the minimum-links finder 41, and has an output 44.

FIGS. 2A-2D are a flow-chart of the preferred method of the present invention of modifying weights of a minimal set of links, including incrementation and decrementation, to cause a user-definable element in a weighted graph of a network that was not in a shortest path in the graph to appear in a shortest path in the graph after said modification.

The first step 51 of the method is receiving on a computing device the weighted graph, where the graph is selected from the group of graphs consisting of an undirected graph and a directed graph, where the graph includes nodes, links, a source node s, and a destination node t. In the preferred embodiment, the weight for each link is a positive integer (i.e., one and greater).

The second step 52 of the method is determining on the computing device a shortest path from s to t. The shortest path is one for which a sum of the weights of the associated links is minimized.

The third step 53 of the method is selecting on the computing device a user-definable element in the graph that is not in the shortest path determined in the second step 52. In the preferred embodiment, the user-definable element is selected from the group of elements consisting of a node and a link, where the link has a node connected to each end of the link.

The fourth step 54 of the method is setting in the computing device n=1 and a first set equal to a null set.

The fifth step 55 of the method is determining on the computing device a path from s to t that includes the user-definable element, where said path includes a first path from s to the user-definable element and a second path from the user-definable element to t, where the first path and the second path do not have any node in common except a node associated with the user-definable element, when the user-definable element is a node. In the preferred embodiment, the fifth step 55 is comprised of the step of determining on the computing device a path from s to t that includes the user-definable element, where said path includes a first path from s to the user-definable element and a second path from the user-definable element to t, where the first path and the second path do not have any node in common except a node associated with the user-definable element when the user-definable element is a node, and where the combined sum of the weights of the links of the first path and the second path is a minimum.

The sixth step 56 of the method is identifying in the computing device links in a path from s to t that include the user-definable element that are not in the path from s to t that does not include the user-definable element.

The seventh step 57 of the method is if decrementing the weights of links identified in the sixth step 56 would result in a link having a weight less than a first user-definable value then proceeding to the thirteenth step 63. Otherwise, proceeding to the eighth step 58. In the preferred embodiment, the first user-definable value is one and the second user-definable value is one when the weights are integers and a positive real number (e.g., a small positive real number) when the weights are real numbers.

The eighth step 58 of the method is decrementing minimally on the computing device the weights of a minimal number of links identified in the fifth step 55 a total amount equal to a sum of the weights of the links from s to t including the user-definable element minus a sum of the weights of the links of the shortest path from s to t that do not include the user-definable element plus a second user-definable value. In the preferred embodiment, the eighth step 58 is comprised of decrementing minimally on the computing device the weights of a minimal number of links identified in the fifth step 55 a total amount equal to a sum of the weights of the links from s to t including the user-definable element minus a sum of the weights of the links of the shortest path from s to t that do not include the user-definable element plus a second user-definable value, where the link with the greatest weight is decremented the largest possible amount and, if necessary, decrementing the link with the next largest amount, and so on.

The ninth step 59 of the method is if the weight-modified path from s to t including the user-definable element is now a shortest path in the graph then proceeding to the tenth step 60. Otherwise, (a) identifying on the computing device a link in the shortest path from s to t that does not include the user-definable element that is not in the path from s to t that includes the user-definable element, wherein said step of identifying on the computing device a link in the shortest path from s to t that does not include the user-definable element that is not in the weight-modified path from s to t that includes the user-definable element is comprised of the step of identifying on the computing device a link (e.g., a first link in the preferred embodiment) in the shortest path from s to t that does not include the user-definable element that is not in the path from s to t that includes the user-definable element; (b) incrementing the weight of the link identified in (a) of the ninth step 59 by an amount equal to the sum of the weights of the weight-modified path from s to t that includes the user-definable element minus the sum of the weights of the links of the shortest path from s to t that does not include the user-definable element plus the second user-definable value; and (c) if the path from s to t that includes the user-definable element is a shortest path in the graph then proceeding to the next step, otherwise, returning to (a) of the ninth step 59.

The tenth step 60 of the method is if there is a path from s to t that does not include the user-definable element that has an equal sum of weights as the path from s to t that includes the user-definable element as modified in the eighth step 58 then identifying on the computing device such a path as the shortest path from s to t that does not include the user-definable element and returning to (a) in the ninth step. Otherwise, proceeding to the eleventh step 61.

The eleventh step 61 of the method is including on the computing device in a second set, which is indexed to n, the links that were modified in the eighth through tenth steps 58-60, the links in the first set, and the modifications made to said links.

The twelfth step 62 of the method is setting in the computing device n=n+1.

The thirteenth step 63 of the method is resetting in the computing device the weights modified in the eighth through tenth steps 58-60 to the corresponding weights in the graph received in the first step 51.

The fourteenth step 64 of the method is identifying in the computing device a shortest path from s to t that does not include the user-definable element.

The fifteenth step 65 of the method is identifying in the computing device a link (e.g., a first link in the preferred embodiment) in the shortest path from s to t that does not include the user-definable element that is not in the path from s to t that includes the user-definable element and adding it to the first set.

The sixteenth step 66 of the method is incrementing in the computing device the weight of the link identified in the fifteenth step 65 by an amount equal to the sum of the weights of the path from s to t that includes the user-definable element minus the sum of the weights of the shortest path from s to t that does not include the user-definable element plus the second user-definable value.

The seventeenth step 67 of the method is determining in the computing device the shortest path from s to t.

The eighteenth step 68 of the method is if the shortest path from s to t determined in the seventeenth step 67 does not include the user-definable element then returning to the sixth step 56. Otherwise, proceeding to the nineteenth step 69.

The nineteenth step 69 of the method is if a path from s to t that does not include the user-definable element has a sum of weights equal to the sum of weights of the path from s to t that includes the user-definable element then designating that path the shortest path from s to t that does not include the user-definable element and returning to the fifteenth step 65. Otherwise, setting the second set, which is indexed to n, equal to the first set.

The twentieth step 70 of the method is identifying in the computing device which of the indexed second sets includes the fewest number of links.

The twenty-first step 71 of the method is modifying the network received in the first step 51 in accordance with the links and modifications to such links in the second set identified in the twentieth step 70.

In a first alternate method, the method described above further including the steps of (a) renaming s and t to t and s, respectively; and (b) redoing the steps of the method described above to determine additional sets of links and modifications to links.

In a second alternate method, the method described above further includes the steps of discarding as soon as possible a particular set of links and modifications to links if the set includes more links than a previously identified set and discarding a previously determined set of links and modifications to their links if the set includes more links than the currently determined set of links. If the present invention identifies sets of links with the same minimum number of links, a number of tie-breakers may be used to select one of such sets of links (e.g., select the set which requires the minimum total amount of modifications to the links, user preference, etc.).

Figure 3A:
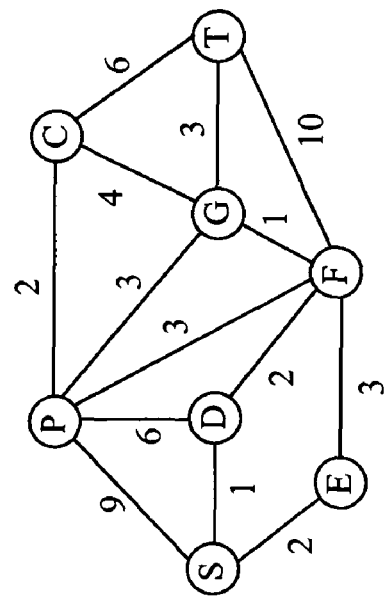
FIGS. 3A-3E are illustrations of the operation of the preferred embodiment of the present invention.
Figure 3B:
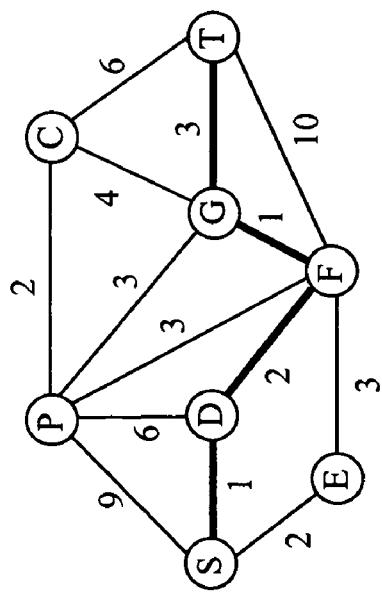
Figure 3C:
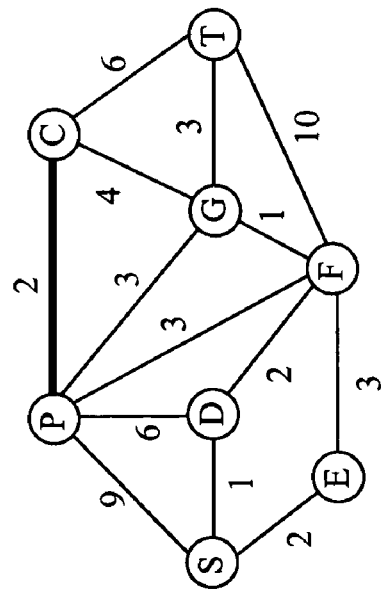
Figure 3D:
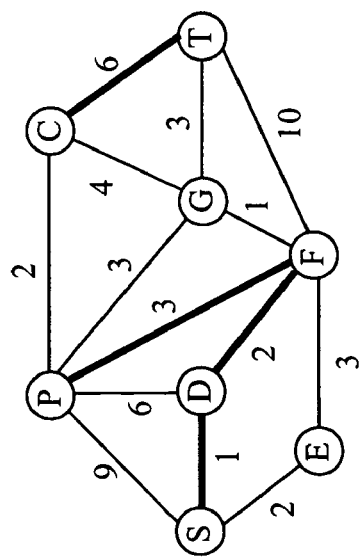
Figure 3E:
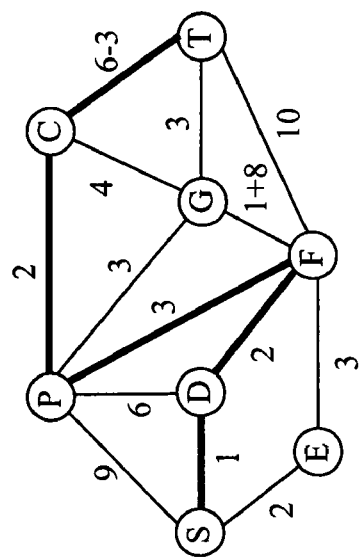

FIGS. 3A-3E are illustrations of the operation of the preferred embodiment of the present invention. FIG. 3A is an illustration of a graph (e.g., undirected graph) of a network. FIG. 3B is an illustration of the shortest path from S to T (i.e., SDFGT) in the graph in FIG. 3A. FIG. 3C is an illustration of the graph of FIG. 3A with a selected link (i.e., PC) that is desired to be in the shortest path from S to T but presently is not. FIG. 3D is an illustration of a first path from s to node P in the selected link and a second path from node C in the selected link to t, where the first path and the second path do not have any node in common and the combined sum of their weights is a minimum. In an alternate embodiment of the present invention, the two paths from S to a node in the selected link and the other node in the selected link to T need not be such a shortest pair of paths. For example, the first path could include nodes S, D, and P, and the second path could include nodes C, G, and T. FIG. 3E is an illustration of the minimum number of links (i.e., CT and FG) that must be modified and the minimum weight modifications to those links (i.e., CT decremented by 3 and FG incremented by 8) that result from the operation of the preferred embodiment of the present invention that would cause the selected link PC to appear in the shorted path from S to T in the weight-modified graph.

What is claimed is:

1. A device for minimally modifying weights of a minimal set of links, including incrementation and decrementation, to cause a user-definable element in a weighted graph of a network that was not in a shortest path in the graph to appear in a shortest path in the graph after said modification, comprising:

a) a receiver for receiving a graph with weights that are real numbers, where the graph includes nodes, links, a source node s, and a destination node t, having an input, and having an output;

b) a first shortest-path finder for determining a shortest path from s to t, where shortest path is one for which a sum of the weights of the associated links is minimized, having an input connected to the output of the receiver, and having an output;

c) an element selector for selecting a user-definable element in the graph that is not in the shortest path determined by the first shortest-path finder, having an input connected to the output of the first shortest-path finder, and having an output;

d) a variable/set setter for setting n=1 and a first set equal to a null set, having an input connected to the output of the element selector, and having an output;

e) a path finder for determining a path from s to t that includes the user-definable element, where said path includes a first path from s to the user-definable element and a second path from the user-definable element to t, where the first path and the second path do not have any node in common except a node associated with the user-definable element when the user-definable element is a node, having an input connected to the output of the variable/set setter, and having an output;

f) a link finder for identifying links in a path from s to t that include the user-definable element that are not in the shortest path from s to t that does not include the user-definable element, having a first input connected to the output of the first shortest-path finder, having a second input connected to the output of the path finder, a third input, and having an output;

g) a decrement checker for determining if decrementing the weights of links would result in a link having a weight less than a first user-definable value and, if so, going to a modified-weight resetter, having an input connected to the output of the link finder, and having an output;

h) a link decrementer for minimally decrementing the weights of a minimal number of links identified by the link finder a total amount equal to the sum of the weights of the links from s to t including the user-definable element minus the sum of the weights of the links of the shortest path from s to t that does not include the user-definable element plus a second user-definable value, having a first input connected to the output of the link finder, having a second input connected to the output of the decrement checker, and having an output;

i) a link finder/incrementer for determining if the weight-modified path from s to t including the user-definable element is now a shortest path in the graph and, if so, going to a duplicate shortest-path finder, otherwise:
  A) identifying a link in the shortest path from s to t that does not include the user-definable element that is not in the path from s to t that includes the user-definable element;
  B) incrementing the weight of the link identified in (i)(A) by an amount equal to a sum of the weights of the weight-modified path from s to t that includes the user-definable element minus a sum of the weights of the links of the shortest path from s to t that does not include the user-definable element plus the second user-definable value; and
  C) if a path from s to t that does not include the user-definable element is a shortest path in the graph then returning to (i)(A), having a first input connected to the output of the link decrementer, having a second input, having a third input, and having an output;
j) the duplicate shortest-path finder for determining if there is a path from s to t that does not include the user-definable element that has an equal sum of weights as the path from s to t that includes the user-definable element as modified then designating such a path as the shortest path from s to t that does not include the user-definable element and going to (i)(A) of the link finder/incrementer, having a first input connected to the output of the link decrementer, having a second input connected to the output of the link finder/incrementer, and having an output;
k) a second-set adder for including in a second set, which is indexed to n, the links that were modified, the links in the first set, and the modifications made to said links, having a first input connected to the output of the link decrementer, having a second input connected to the output of the link finder/incrementer, having a third input connected to the output of the duplicate shortest-path finder, and having an output;
l) an index incrementer for setting n=n+1, having an input connected to the output of the second-set adder, and having an output;
m) the modified-weight resetter for resetting the weights modified in the link decrementer, the link finder/incrementer, and the duplicate shortest-path finder to the corresponding weights in the graph received, having a first input connected to the output of the decrement checker, a second input connected to the output of the link decrementer, a third input connected to the output of the link finder/incrementer, having a fourth input connected to the output of the duplicate shortest-path finder, having a fifth input connected to the output of the index incrementer, and having an output;
n) a second shortest-path finder for identifying a shortest path from s to t that does not include the user-definable element, having an input connected to the output of the modified-weight resetter, and having an output;
o) a non-common link finder and set updater for identifying a link in the shortest path from s to t that does not include the user-definable element that is not in the path from s to t that includes the user-definable element and adding it to the first set, having a first input connected to the output of the second shortest-path finder, having a second input, and having an output;
p) a link incrementer for incrementing the weight of an identified link by an amount equal to the sum of the weights of the path from s to t that includes the user-definable element minus the sum of the weights of the shortest path from s to t that does not include the user-definable element plus the second user-definable value, having an input connected to the output of the non-common link finder and set updater, and having an output;
q) a third shortest-path finder for determining the shortest path from s to t, having an input connected to the output of the link incrementer, and having an output;
r) an element-in-shortest-path checker for determining if the shortest path from s to t includes the user-definable element and, if so, going to a second duplicate-path checker, otherwise going to the link finder, having an input connected to the output of the third shortest-path finder, and having an output;
s) the second duplicate-path checker for determining if a path from s to t that does not include the user-definable element has a sum of weights equal to the sum of weights of the path from s to t that includes the user-definable element and, if so, designating that path the shortest path from s to t that does not include the user-definable element and going to the non-common link finder and set updater, otherwise setting the second set, which is indexed to n, equal to the first set, having an input connected to the output of the element-in-shortest-path checker, and having an output connected to the second input of the non-common link finder and set updater;
t) a minimum-links finder for identifying which of the indexed second sets includes the fewest number of links, having an input connected to the output of the second duplicate path checker, and having an output; and
u) a network modifier for modifying the network received in accordance with the links and modifications to such links in the identified second set, having an input connected to the output of the minimum-links finder, and having an output.

2. A method of minimally modifying weights of a minimal set of links, including incrementation and decrementation, to cause a user-definable element in a weighted graph of a network that was not in a shortest path in the graph to appear in a shortest path in the graph after said modification, comprising the steps of
  a) receiving on a computing device the weighted graph, where the weighted graph includes nodes, links, a source node s, and a destination node t;
  b) determining on the computing device a shortest path from s to t, where shortest path is one for which a sum of the weights of the associated links is minimized;
  c) selecting on the computing device a user-definable element in the graph that is not in the shortest path determined in step (b);
  d) setting in the computing device n=1 and a first set equal to a null set;
  e) determining on the computing device a path from s to t that includes the user-definable element, where said path includes a first path from s to the user-definable element and a second path from the user-definable element to t, where the first path and the second path do not have any node in common except a node associated with the user-definable element when the user-definable element is a node;
  f) identifying in the computing device links in a path from s to t that include the user-definable element that are not in the path from s to t that does not include the user-definable element;
  g) if decrementing the weights of links identified in step (f) would result in a link having a weight less than a first user-definable value then proceeding to step (m), otherwise proceeding to the next step;

h) decrementing minimally on the computing device the weights of a minimal number of links identified in step (e) a total amount equal to a sum of the weights of the links from s to t including the user-definable element minus a sum of the Weights of the links of the shortest path from s to t that do not include the user-definable element plus a second user-definable value;

i) if the weight-modified path from s to t including the user-definable element is now a shortest path in the graph then proceeding to step (j), otherwise:
   A. identifying on the computing device a link in the shortest path from s to t that does not include the user-definable element that is not in the path from s to t that includes the user-definable element;
   B. increment the weight of the link identified in step (i)(A) by an amount equal to the weights of the weight-modified path from s to t that includes the user-definable element minus the weights of the links of the shortest path from s to t that does not include the user-definable element plus the second user-definable value;
   C. if the path from s to t that includes the user-definable element is a shortest path in the graph then proceeding to the next step, otherwise, returning to step (i)(A);

j) if there is a path from s to t that does not include the user-definable element that has an equal sum of weights as the path from s to t that includes the user-definable element as modified in step (h) then identifying on the computing device such a path as the shortest path from s to t that does not include the user-definable element and returning to step (i)(A), otherwise proceeding to the next step;

k) including on the computing device in a second set, which is indexed to n, the links that were modified in steps (h)-(j), the links in the first set, and the modifications made to said links;

l) setting in the computing device n=n+1;

m) resetting in the computing device the weights modified in steps (h)-(j) to the corresponding weights in the graph received in step (a);

n) identifying in the computing device a shortest path from s to t that does not include the user-definable element;

o) identifying in the computing device a link in the shortest path from s to t that does not include the user-definable element that is not in the path from s to t that includes the user-definable element and adding it to the first set;

p) incrementing in the computing device the weight of the link identified in step (o) by an amount equal to the sum of the weights of the path from s to t that includes the user-definable element minus the sum of the weights of the shortest path from s to t that does not include the user-definable element plus the second user-definable value;

q) determining in the computing device the shortest path from s to t;

r) if the shortest path from s to t determined in step (q) does not include the user-definable element then returning to step (f), otherwise proceeding to the next step;

s) if a path from s to t that does not include the user-definable element has a sum of weights equal to the sum of weights of the path from s to t that includes the user-definable element then designating that path the shortest path from s to t that does not include the user-definable element and returning to step (o), otherwise setting the second set, which is indexed to n, equal to the first set;

t) identifying in the computing device which of the indexed second sets includes the fewest number of links; and u) modifying the network received in step (a) in accordance with the links and modifications to such links in the second set identified in step (t).

3. The method of claim 2, wherein said user-definable element is selected from the group of elements consisting of a node and a link, where the link has a node connected to each end of the link.

4. The method of claim 2, wherein said weight for each link is a real number including zero.

5. The method of claim 2, wherein said step of determining on the computing device a path from s to t that includes the user-definable element is comprised of the step of determining on the computing device a path from s to t that includes the user-definable element, where said path includes a first path from s to the user-definable element and a second path from the user-definable element to t, where the first path and the second path do not have any node in common except a node associated with the user-definable element when the user-definable element is a node; and where the combined sum of the weights of the links of the first path and the second path is a minimum.

6. The method of claim 2, wherein said step of decrementing minimally on the computing device the weights of a minimal number of links identified in step (e) a total amount equal to a sum of the weights of the links from s to t including the user-definable element minus a sum of the weights of the links of the shortest path from s to t that do not include the user-definable element plus a second user-definable value, where the link with the greatest weight is decremented the largest possible amount and, if necessary, decrementing the link with the next largest amount, and so on.

7. The method of claim 2, wherein said first user-definable value is one and the second user-definable value is selected from the group of values consisting of one for weights that are integers and a user-definably small positive real number for weights that are non-integer real numbers.

8. The method of claim 2, wherein said step of identifying on the computing device a link in the shortest path from s to t that does not include the user-definable element that is not in the path from s to t that includes the user-definable element is comprised of the step of identifying on the computing device a first link in the shortest path from s to t that does not include the user-definable element that is not in the path from s to t that includes the user-definable element.

9. The method of claim 2, further including the steps of:
   a) renaming s and t to t and s, respectively; and
   b) redoing the steps of claim 1 to determine additional sets of links and modifications to links.

10. The method of claim 2, further including the step of discarding a current set of links and modifications to links if the set includes more links than a previously identified set of links and discarding a previous set of links and modifications to links if the set includes more links than a currently identified set of links.

11. The method of claim 2, wherein said step of receiving on a computing device the weighted graph, where the weighted graph includes nodes, links, a source node s, and a destination node t is comprised of the step of receiving on a computing device the weighted graph, where the weighted graph includes nodes, links, a source node s, and a destination node t, and where the weighted graph is selected from the group of weighted graphs consisting of an undirected weighted graph and a directed weighted graph.

12. The method of claim 3, wherein said weight for each link is a real number including zero.

13. The method of claim 11, wherein said step of determining on the computing device a path from s to t that includes the user-definable element is comprised of the step of computing device a path from s to t that includes the user-definable element, where said path includes a first path from s to the user-definable element and a second path from the user-definable element to t, where the first path and the second path do not have any node in common except a node associated with the user-definable element when the user-definable element is a node, and where the combined sum of the weights of the links of the first path and the second path is a minimum.

14. The method of claim 12, wherein said step of decrementing minimally on the computing device the weights of a minimal number of links identified in step (e) a total amount equal to a sum of the weights of the links from s to t including the user-definable element minus a sum of the weights of the links of the shortest path from s to t that do not include the user-definable element plus a second user-definable value, where the link with the greatest weight is decremented the largest possible amount and, if necessary, decrementing the link with the next largest amount, and so on.

15. The method of claim 13, wherein said first user-definable value is one and the second user-definable value is selected from the group of values consisting of one for weights that are integers and a user-definably small positive real number for weights that are non-integer real numbers.

16. The method of claim 14, wherein said step of identifying on the computing device a link in the shortest path from s to t that does not include the user-definable element that is not in the path from s to t that includes the user-definable element is comprised of the step of identifying on the computing device a first link in the shortest path from s to t that does not include the user-definable element that is not in the path from s to t that includes the user-definable element.

17. The method of claim 15, further including the steps of:
a) renaming s and t to t and s, respectively; and
b) redoing the steps of claim 1 to determine additional sets of links and modifications to links.

18. The method of claim 16, further including the step of discarding a current set of links and modifications to links if the set includes more links then a previously identified set and discarding a previous set of links and modifications to links if the set includes more links then a currently identified set of links.

19. The method of claim 18, wherein said step of receiving on a computing device the weighted graph, where the weighted graph includes nodes, links, a source node s, and a destination node t is comprised of the step of receiving on a computing device the weighted graph, where the weighted graph includes nodes, links, a source node s, and a destination node t, and where the weighted graph is selected from the group of weighted graphs consisting of an undirected weighted graph and a directed weighted graph.

* * * * *